United States Patent [19]

Cuomo et al.

[11] 4,005,698

[45] Feb. 1, 1977

[54] PHOTON ENERGY CONVERTER

[75] Inventors: Jerome John Cuomo, Bronx, N.Y.; Jerry MacPherson Woodall, Saratoga, Calif.; James Francis Ziegler, Putnam Valley, N.Y.

[73] Assignee: International Business Machines Corporation, Armonk, N.Y.

[22] Filed: Oct. 18, 1974

[21] Appl. No.: 515,780

[52] U.S. Cl. .............................. 126/270; 126/400; 427/253; 136/89 PC; 73/355 R; 427/160; 427/162; 136/206

[51] Int. Cl.² .......................................... F24J 3/02

[58] Field of Search ................. 126/400, 270, 271; 73/355 R; 136/206, 89; 156/612, 613, 614; 428/97; 427/252, 253, 160

[56] References Cited

UNITED STATES PATENTS

| | | | |
|---|---|---|---|
| 1,497,417 | 6/1924 | Weber | 427/252 |
| 2,588,254 | 3/1952 | Lank-Horovitz | 136/89 |
| 2,677,715 | 5/1954 | Auwarter | 136/89 |
| 2,836,524 | 5/1958 | Brenner et al. | 156/613 |
| 2,899,659 | 8/1959 | McIlvaine | 136/89 |
| 2,998,006 | 8/1961 | Johnston | 126/271 |
| 3,173,801 | 3/1965 | Lipkis et al. | 427/160 |
| 3,194,228 | 7/1965 | Bangues | 126/271 |
| 3,225,208 | 12/1965 | Wolfe | 136/206 |
| 3,229,682 | 1/1966 | Perlmutter et al. | 126/270 |
| 3,276,903 | 10/1966 | Galmiche | 427/253 |
| 3,294,654 | 12/1966 | Norman et al. | 427/252 |
| 3,368,914 | 2/1968 | Dannell et al. | 427/253 |
| 3,567,946 | 3/1971 | Paul | 136/89 |
| 3,814,625 | 6/1974 | Lewin et al. | 427/253 |

*Primary Examiner*—John J. Camby
*Assistant Examiner*—Henry C. Yuen
*Attorney, Agent, or Firm*—George Baron; John A. Jordan; J. Jancin, Jr.

[57] ABSTRACT

An efficient converter of photon energy to heat has been devised comprising a dense array of metal whiskers grown with spacings between the whiskers of a few wavelengths of visible light. The material selected, and tungsten is exemplary of such materials, has low emissivity, but achieves significant optical absorption by trapping the light impinging on the dense array by a geometric maze effect. The characteristics of the surface are excellent for the conversion of solar energy to heat.

22 Claims, 5 Drawing Figures

PHOTON ENERGY CONVERTER

BACKGROUND OF THE INVENTION

The conversion of incident solar light to thermal energy has recently become of widespread interest. Since Kirchoff's Law joins together absorptivity and emissivity, most attempts to improve solar absorption have involved the development of materials which have high absorptivity in the solar wavelengths (visible spectrum, mainly) and low emissivity in the system operating temperatures (near infrared black body radiation for an operating temperature of 550° C which is typical of steam pressure used in turboelectric generators).

The devices fabricated using this concept are multi-layered structures, called inteference stacks or bulk-absorber stacks. See "Physics Looks at Solar Energy" by A. B. Meinel et al, appearing in Physics Today, February 1972, pp. 44–50. These stacks create a selective surface that is black for wavelengths shorter than 1.3 microns and mirrorlike for longer wavelengths. Thus the stacks serve to create a surface having a double function, namely, high absorptivity over the solar emission band and low emissivity over the blackbody emission range and thus lend themselves to use as efficient converters of thermal energy into heat reservoirs. These devices have problems of stability at moderate temperatures, such as 550° C, and demand submicron thickness tolerances over the wide areas necessary for solar conversion. So little is known about thin film interaction and diffusion, that film stability has been the major obstacle in the operation of these devices.

The present invention converts photon energy to heat by the use of an absorbing surface which is a geometric maze whose microstructure is similar in geometry to an acoustic anechoic surface. The optical photon absorber surface consists of a dense forest of aligned needles of dimensions of the order of visible wavelengths with a spacing between such needles of the order of several wavelengths of visible light. Such a surface is believed to absorb with a high efficiency because of multiple reflections occurring as the incident photons penetrate the needle maze in a manner similar to that in which absorption takes place in an anechoic chamber because of multiple reflections of sound. For a narrow incident cone surrounding the direction of the needles, the maze has an absorptivity approaching 1. However, only a small part of the hemispherical emissivity is concentrated in this narrow cone. Thus, by making the needles of the solar energy converting device of a low emissivity metal, e.g., tungsten, the total integrated hemispherical emissivity of the device is considerably less than 1.

Consequently it is a primary object of this invention to make a device in such a manner that the material will be highly absorbing within a narrow cone of incident light but have a very low hemispherical emissivity over the black body radiant wavelengths at the operating temperature of the device.

DESCRIPTION OF THE INVENTION

Figure 1:
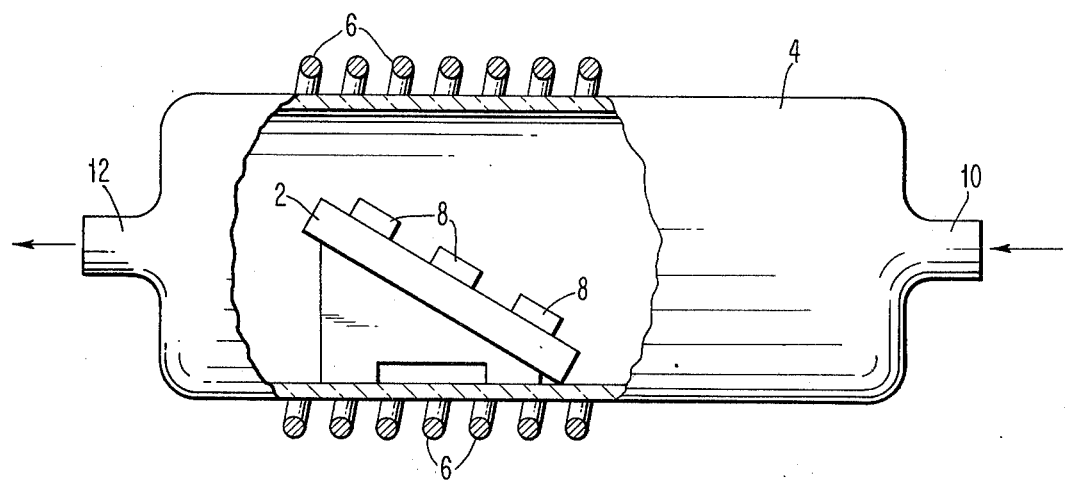
FIG. 1 is a schematic showing of how the novel device is grown.

The construction of the device is begun as seen in FIG. 1, by placing a graphite or carbon susceptor 2 within a chamber 4, the susceptor being maintained at a desired temperature of 450° to 550° C by means of heating coils 6 surrounding said chamber 4 in the vicinity of the susceptor 2. Prior to the insertion of the susceptor 2 into chamber 4, substrates 8 are affixed at various locations on susceptor 2. Suitable substrates 8 have been shown to be sapphire ($Al_2O_3$), stainless steel, or polished tungsten. Stainless steel is an exceptionally good substrate. The stainless steel is first pickled in HCl to dissolve the chromium of the stainless steel; as an alternative, nickel is electroplated on the stainless steel to provide a base on which dendrites, to be described hereinbelow, can be grown.

Once the substrates 8 and their supporting susceptor block 2 are inserted into chamber 4, coils 6 are energized to heat the substrates 8 between 450° to 550° C (the usual thermocouples for monitoring the temperature and feedback circuits for applying more or less current to coils 6 are not shown in that they are conventional equipment). At this time, $H_2$ and $WF_6$ are introduced into chamber 4 at inlet port 10. The flow rate of tungsten hexafluoride ($WF_6$) is 100 standard cc./minute and that of the $H_2$ is 10–25 liters/minute, both at atmospheric pressure. The $WF_6$ and $H_2$ gases react in the chamber 4 as $WF_6 + 3H_2 \rightarrow 6HF + W$, the tungsten being deposited on the substrates 8 and the unused $H_2$, $WF_6$ gases and reaction product gas HF all exiting at exit port 12. This process, referred to as the hydrogen reduction of tungsten hexafluoride, is described in greater detail in an article by A. F. Mayadas, J. J. Cuomo and R. Rosenberg appearing on pages 1742–45, Vol. 116, of the 1969 issue of the Journal of the Electrochemical Society.

In one growth example, the $H_2$ flow rate was about 10 liters/minute and the $WF_6$ flow rate was 0.1 liters/minute. After a 15 minute period, the thickness of the film of tungsten deposited on the substrate 2 ranged from 125 to 500 microns. The structure of the tungsten film on a sapphire substrate, when analyzed, was found to have the crystal structure $(111)W//(0001)\alpha Al_2O_3$ and its orientation in the plane of the tungsten film was $[110]W//[11\bar{2}0]\alpha Al_2O_3$. The orientation of the tungsten dendrites was twinned and is found to occur in two specific ways, one having a 6 fold symmetry and the other twin a 3 fold symmetry.

Figure 2:
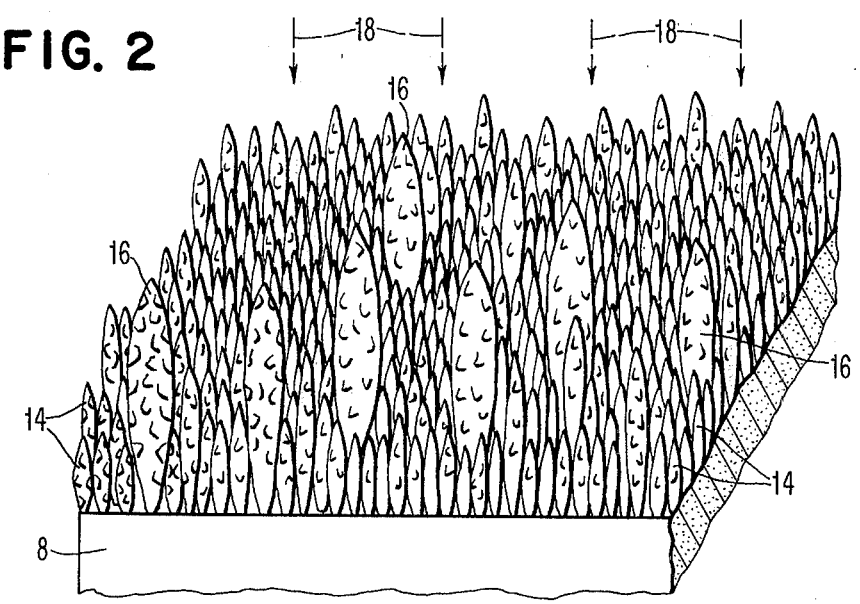
FIG. 2 is a showing of how the device grown in FIG. 1 looks when enlarged through suitable amplification.

In FIG. 2 is shown the general dendritic growth of the tungsten deposited by the hydrogen reduction of tungsten hexafluoride at atmospheric pressure. The growth resulted generally in a multi-layered unit. The substrate 8, be it sapphire, tungsten, stainless steel or the like, determined the preferred orientation of the initial spikes 14 of the tungsten that were grown on it. These initial spikes grew in the first 10–15 minutes and were about 2–3 microns in height. Further growth then took place preferentially on the taller spikes. In general, growth takes place to effectively produce a three-layered structure composed of a substrate 8, a forest composed of individual dendrites 14 that are about 5 microns high and about 5 microns apart from center to center and a less dense forest of tungsten dendrites 16 that are about 20 to 40 microns tall and with their centers separated by 40 to 60 microns. It was observed that greater than 98 percent of all photon wavelengths between 0.2 to 40 microns are absorbed by the dendritic structure if such wavelengths enter the forest within a 5° cone and the vertical axis of such cone is parallel to the direction of the dendritic growth axis.

Figure 3:
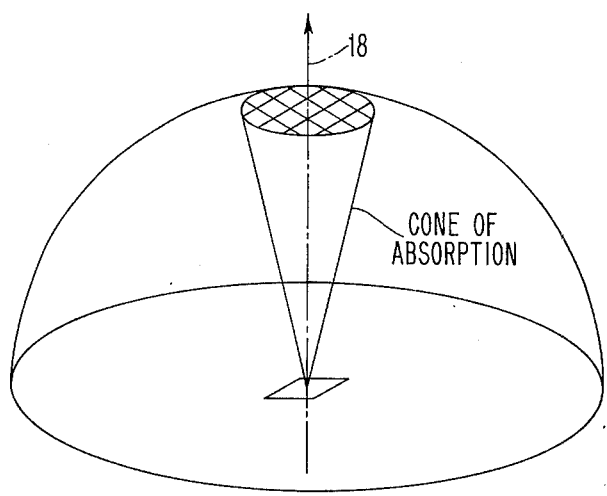
FIG. 3 is a schematic of the absorption character of the device showing a cone of high absorption whose vertical axis is parallel to the rays of the incoming radiation and the angle of the cone is 15–30 degrees.

This forest of dendritic tungsten is particularly advantageous as a photon energy conversion device because tungsten is normally a poor absorber and a poor emitter of radiation. However, the anechoic behavior of the populous dendrites 14 and 16 to incoming radiation makes the dendritic maze a good absorber of such radiation. If one looks visually at the forest within this 15–30 degree angle (See FIG. 3), it appears jet black. If one looks at the forest of dendrites from an angle greater than 30°, the surface looks grayish, and progresses to silvery indicating that the optical emissivity of the dendritic structure is greatly reduced. FIG. 3, in effect, is a schematic showing how the novel structure is employed to operate within the well known laws of radiant absorption and emissivity, namely, that the emissivity ($\epsilon_1$) in a perpendicular cone to a surface is equal to the absorptivity of radiation ($A_1$) in that same cone. Ideally both are equal to 1. The emissivity ($\epsilon_2$) at all angles outside the cone also equals the absorptivity ($A_2$) and both, ideally, should be very small. The axis 18 of the needle array of FIG. 2 is parallel to the incoming photons which enter within a cone of 15°–30° with a 5° cone being preferred. For this cone, the absorptivity and emissivity of the device is substantially unity. The hemispherical emissivity, which is the emissivity integrated over the entire hemisphere of the surface, has been demonstrated to be as low as 0.26.

Figure 4:
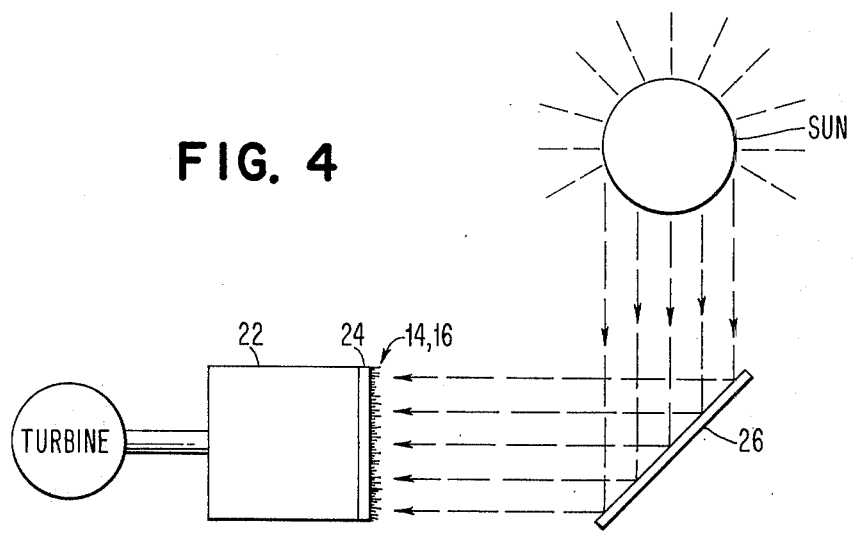
FIG. 4 is a schematic example of how the invention can be employed as a receiver and accumulator of solar energy.

FIG. 4 depicts a manner of employing the invention in a practical way. A container 22 of a liquid forming a high pressure vapor at the operating temperature, such as water, is partially surrounded by the unit 24 made to have the physical characteristics of the device of FIG. 2 of the drawings. The sun's rays, are reflected by mirror 26 onto the maze of tungsten dendrites 14 and 16 shown in FIG. 2 of the radiation to heat converting device 24.

Figure 5:
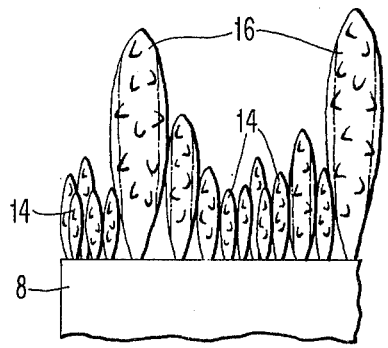
FIG. 5 is a showing of the effect of chemical etching on the dendritic growths of the device and is a fragmentary showing of FIG. 2.

For different frequency photons to be absorbed by the dendritic tungsten, it may be necessary to change the ratio of height to width of the individual dendrites 14 and 16. A means to accomplish this is to etch the entire device of FIG. 2 in a solution of $H_2O_2 + NH_4OH$. The widths of such dendrites etch more rapidly than their heights, so the modified array of FIG. 5 can be used more efficiently for longer wavelengths of radiation than that of the unetched array of FIG. 2. The dotted lines represent the width of the dendrites after etching.

Other absorbing characteristics can be obtained by changing the dendrite density and the dendrite height. This can be accomplished by varying the deposition temperature and gas flow rate in the chamber shown in FIG. 1.

The invention also envisions the use of a low emissive coating material over dendrites 14 and 16. Tungsten, per se, has a hemispherical emissivity of 0.08 whereas gold has only an emissivity of 0.02 at 550° C. Thus a coating of gold over the tungsten dendrites would drop the tungsten hemispherical emissivity from 0.08 to 0.02. By judicious choice of coatings, proper tradeoffs can be achieved whereby the advantages of lower emissivities can be obtained. Such lower emissivity coating also serves to passivate the tungsten and retard corrosion and oxidation.

The device described herein is particularly suitable as a solar energy converter in that a single refractory material is used in making the converter so that the device has a very high probability of remaining stable as it performs its role as an energy converter.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An efficient broad band absorber of photons, comprising;
    a thermally conductive substrate;
    a dendritic distribution of material on said thermally conductive substrate, said distribution including effectively aligned needle-like protrusions extending from said substrate and arrayed in a random pattern thereover, the density of said protrusions being such that their individual height and width dimensions as well as their respective separations are of the order of a few incident photon wavelengths such that said protrusions act as a broad band photon absorber to convert the energy of said photons to heat in said thermally conductive substrate.

2. A photon energy converter for converting photon energy to heat, comprising;
    a thermally conductive substrate;
    a dendritic distribution of protrusions projecting from said thermally conductive substrate and arrayed in a random pattern thereover of random sizes with the individual height and width dimensions as well as the respective separations between said protrusions being of the order of a few incident photon wavelengths wherein said dendritic distribution comprises a dense array of said protrusions which acts as a broad band photon absorber to dissipate said photon energy into lattice vibrations in said protrusions to form heat therefrom in said thermally conductive substrate.

3. The converter of claim 2 wherein said dendritic distribution of protrusions is composed of a low emissivity material.

4. The converter of claim 2 wherein said dendritic distribution of protrusions is composed of a refractory material.

5. The converter of claim 4 wherein said dendritic distribution of protrusions is tungsten.

6. The converter of claim 2 wherein said substrate is sapphire.

7. The converter of claim 2 wherein said substrate is tungsten.

8. The converter of claim 2 wherein said substrate is stainless steel.

9. The converter of claim 3 wherein said dendritic distribution of protrusions has a coating over it, said coating having an emissivity considerably lower than said protrusions so as to lower the hemispherical emissivity of said dendritic surface.

10. The converter of claim 3 wherein said dendritic distribution of protrusions has a thin passivating coating over it.

11. A broad band energy converter for converting photon energy to heat, comprising;
a thermally conductive substrate;
a dendritic distribution of protrusions projecting from said thermally conductive substrate and distributed in a random pattern of varying height dimensions thereover with the individual height dimensions and the respective separations between adjacent protrusions of similar height dimensions all being within an order of magnitude of a few wavelengths of incident photon energy wherein said protrusions form a dense distribution of varying height dimensions and separations which act to provide a broad band photon absorber to dissipate said photon energy into lattice vibrations in said protrusions to thereby produce heat therefrom in said thermally conductive substrate.

12. The energy converter as set forth in claim 11 wherein said dendritic distribution of protrusions acts to absorb photon energy having wavelengths between 0.2 and 40 microns.

13. A broad band energy converter for converting photon energy to heat, comprising;
a thermally conductive substrate;
a dendritic distribution of protrusions projecting from said thermally conductive substrate and distributed in a random pattern of varying height dimensions thereover with the individual height and width dimensions and the respective separations between said protrusions being within an order of magnitude of a few wavelengths of incident photon energy wherein said protrusions form a dense distribution of varying height dimensions which acts as a broad band photon absorber to dissipate said photon energy into lattice vibrations in said protrusions to form heat therefrom in said thermally conductive substrate.

14. The energy converter as set forth in claim 13 wherein said dendritic distribution of protrusions comprises a low-emissivity material.

15. The energy converter as set forth in claim 13 wherein said dendritic distribution of protrusions comprises a refractory material.

16. The energy converter as set forth in claim 13 wherein said dendritic distribution of protrusions is tungsten.

17. The energy converter as set forth in claim 13 wherein said substrate is sapphire.

18. The energy converter as set forth in claim 13 wherein said substrate is tungsten.

19. The energy converter as set forth in claim 13 wherein said substrate is stainless steel.

20. The energy converter as set forth in claim 16 wherein said substrate is stainless steel.

21. The energy converter as set forth in claim 20 wherein said dendritic distribution of protrusions has a coating thereover with said coating exhibiting an emissivity lower than that of said dendritic distribution of protrusions of tungsten.

22. The energy converter as set forth in claim 21 wherein said coating acts to passivate said tungsten.

* * * * *